United States Patent [19]

Susko

[11] Patent Number: 4,986,497
[45] Date of Patent: Jan. 22, 1991

[54] AIRCRAFT-DE-ICING SYSTEM

[75] Inventor: Kenneth A. Susko, Elmont, N.Y.

[73] Assignee: COM-PRO Systems, Inc., Elmont, N.Y.

[21] Appl. No.: 367,424

[22] Filed: Jun. 16, 1989

[51] Int. Cl.$^5$ ............................................. B64D 15/10
[52] U.S. Cl. ............................ 244/134 C; 244/134 R; 137/93; 137/88
[58] Field of Search ........................ 244/134 R, 134 C; 239/61, 67, 69, 135, 137; 137/92, 93, 88

[56] References Cited

U.S. PATENT DOCUMENTS

| | | | |
|---|---|---|---|
| 2,483,102 | 9/1949 | Pierson | 137/93 |
| 2,868,216 | 1/1959 | Robertson | 137/93 |
| 3,124,148 | 3/1964 | Kleiss et al. | 137/93 |
| 3,307,744 | 3/1967 | Burford | 244/134 C |
| 4,191,348 | 3/1980 | Holwerda | 244/134 C |
| 4,842,005 | 6/1989 | Hope et al. | 244/134 C |

FOREIGN PATENT DOCUMENTS

86/00592 6/1985 PCT Int'l Appl. .

Primary Examiner—Sherman Basinger
Assistant Examiner—Anne Sartelle
Attorney, Agent, or Firm—Hopgood, Calimafde, Kalil, Blaustein & Judlowe

[57] ABSTRACT

The invention comtemplates preparation of glycol/water de-icing mixtures in a demand-operated system wherein index of refraction and temperature are continuously monitored in a recirculating loop. The supply of heat and changes in mixing proportions of separate flows of water and of glycol are monitored until such time as predetermined values of mixed-fluid temperture and refractive index are achieved. A computer accepts monitoring-signal values for mixed-fluid temperature and refractive index, and further accepts ambient-condition signal values for set-point variation in mixing proportions, as necessary for economical use of glycol in the mixture, under each of a plurality of different ambient conditions.

19 Claims, 1 Drawing Sheet

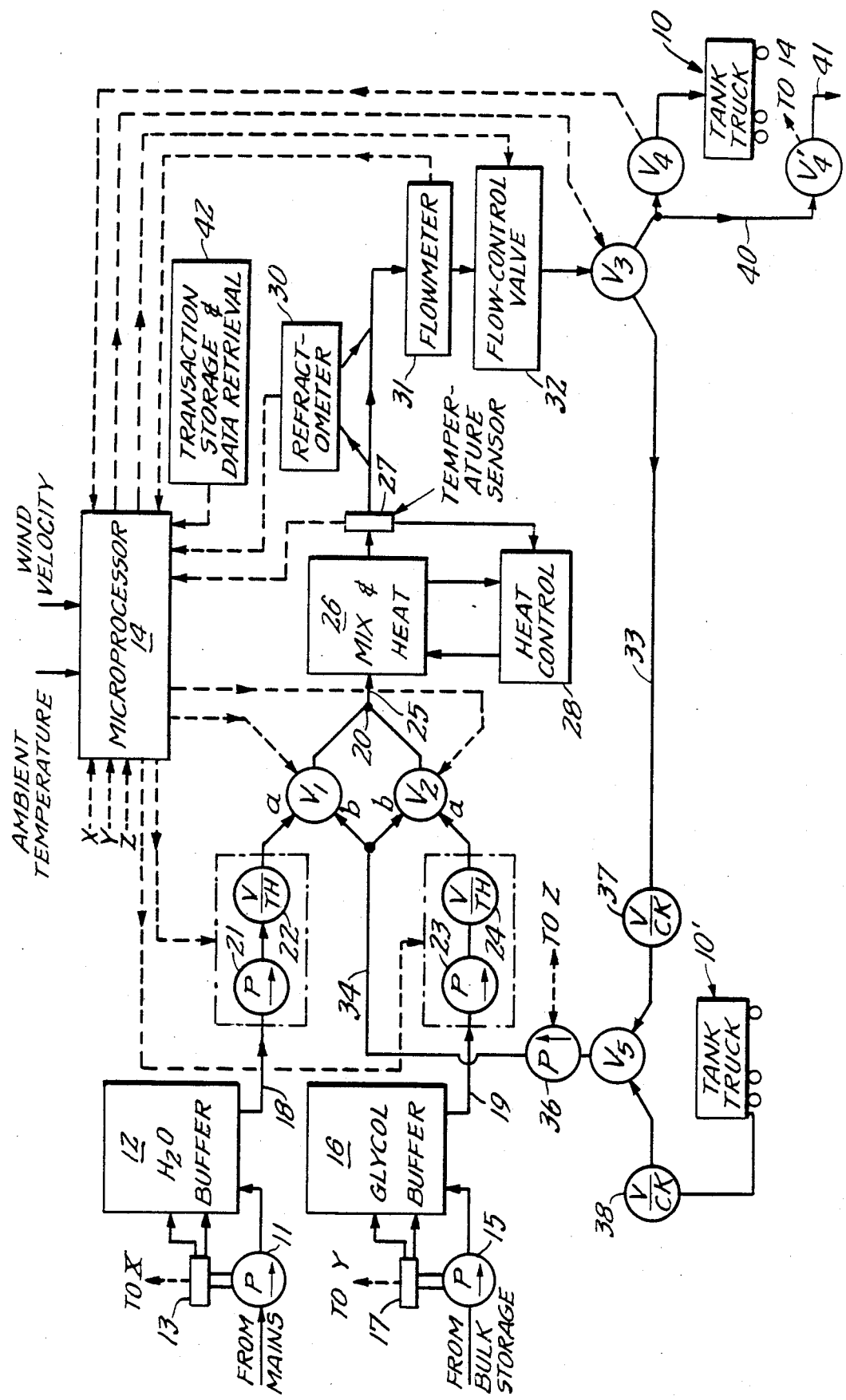

AIRCRAFT-DE-ICING SYSTEM

BACKGROUND OF THE INVENTION

The invention relates to a system for preparing a de-icing mixture of glycol and water for use on demand in the spraying of aircraft prior to take-off under icing conditions.

It has been a general practice to prepare de-icing mixture of the character on a motorized truck and just prior to discharge upon wing and fuselage surfaces of an involved aircraft. The truck has its own tanks for the separate containment of glycol and water, as sources for pumped extraction, mixing, and heating prior to discharge. The ability to control temperature and mixing proportions is poor, and because safety of aircraft is primary, excessively rich discharges are the rule. Excessive richness is wasteful of glycol, and the rising cost of glycol is making such wasteful use intolerable. U.S. Pat. No. 4,723,733 discloses a truck of the character indicated, and German Auslegeschrift No. 1,266,139 also discloses truck-borne mixing apparatus.

It has been another practice to prepare, accumulate and maintain a reservoir of mixed and heated de-icing fluid, i.e., in bulk, in readiness for use when required. But this technique has various disadvantages, not the least of which is that continuous maintenance of desired temperature, e.g., 180° F., entails (1) the expense of continuous heating, (2) the progressive enrichment of the mixed fluid as water is vaporized, and (3) an inability to correct the mixed proportions in response to a change in ambient temperature and/or wind conditions. U.S. Pat. Nos. 3,533,395 and 4,191,348 disclose bulk-preparation systems of this general nature, and subject to the indicated disadvantages.

Published PCT Application WO 79/00331 and U.S. Pat. No. 4,634,084 disclose overhead spraying structure through which an aircraft is moved in the course of a spraying cycle. The problem of glycol waste and environmental protection is recognized by a system of underground waste-collection piping, fed by spilled-mixture seepage through a porous pavement. The underground-collected mixture is returned to a sump, for accumulation, reprocessing and recycled use via the spraying system. These patents are concerned either with the control of spraying for different aircraft configurations, or with detail of the porous pavement; but these patents are uninformative in the matter of how to achieve economies in the mixing and supply of de-icing fluid.

U.S. Pat. No. 3,612,075 also discloses an overhead system for spraying aircraft of different configurations. There is recognition of problems arising from extreme weather conditions (i.e., high winds, heavy snow), but the patent is silent on any satisfactory means for control, other than manual control, in the face of such conditions.

Published PCT Application WO 86/00592 discloses a computer-operated system which responds to ambient conditions of temperature, including wing-surface temperature, and which controls the mixing of water and glycol in accordance with a program-selected mixture ratio. Mixture ratio is controlled by automated control of the respective rates of flow of water and glycol; these rates are individually measured at all times to determine the instantaneous or "real" flow rates, and from these measurements of "real" flow rates, the "real" mixture ratio is calculated. The calculated "real" mixture ratio is available as an electric feedback signal for comparison with a signal representing the program-selected mixture ratio, and the difference between these signals is used to effect appropriate correction of the respective flow rates. This system is subject to several deficiencies, not the least of which is the fact that measurement of flow rates alone will not provide a proper index of the de-icing capability of the mixed fluid, in that the mixture ratio is determined from comparison of flow rates, on the unrealistic assumption that the glycol flow is always of the same quality, whereas it may be and often is subject to an unknown fractional content of water dilution.

BRIEF STATEMENT OF THE INVENTION

It is an object of the invention to provide an improved system for control of mixing proportions and temperature in delivered de-icing fluid.

A specific object is to achieve the above object on demand, i.e., without having to store a supply of prepared de-icing fluid.

Another specific object is to provide a system which will automatically prepare de-icing fluid and which will not deliver the same unless delivered product meets predetermined conditions of temperature and refractive index.

Still another specific object is to meet the above objects with a system which can accept recycled use of prior de-icing mix and reprocess the same for correct proportions that reflect a change in ambient and/or aircraft-surface conditions.

It is also a specific object to provide a system meeting the above objects and providing documented or documentable evidence of the actual mixture proportions of de-icing fluid, the same being specifically further identified with the time and volumetric content of each delivery of mixed product.

It is a general object to meet the above objects with a system of automatically producing, on demand, only correctly proportioned and heated flows of economically mixed glycol, as may be dictated by current ambient conditions of temperature, wind and the like.

The invention achieves these objects in a demand-operated water/glycol mixing system by continuously monitoring index of refraction and temperature of mixed-fluid flow in a recirculating loop, and regulating the supply of heat and changes in mixing proportions of separate flows of water and of glycol until such time as predetermined values of mixed-fluid temperature and refractive index are achieved. A computer accepts monitoring-signal values for mixed-fluid temperature and refractive index, and further accepts ambient-condition signal values for set-point variation in mixing proportions, as necessary for economical use of glycol in the mixture, under each of a plurality of different ambient conditions.

DESCRIPTION OF THE DRAWING

The invention will be described in detail for a preferred embodiment, in conjunction with the accompanying drawing which is a block-diagram schematically showing interrelated components of a demand-type system for delivery of mixtures of glycol and water, for de-icing of aircraft.

DESCRIPTION OF THE PREFERRED EMBODIMENT

The drawing depicts a mixing-system station, for controlled production of de-icing fluid flows, suitable for delivery to the tank of a truck 10 or other delivery means to aircraft-spraying apparatus (not shown). The mixing station draws water from mains (or other source) via a motor-driven pump 11 to assure an adequate level of buffer storage at a tank 12; to this end, means 13 for on-off control of the motor for pump 11 has separate means of sensing upper and lower water levels in tank 12, and a connection X—X to a microprocessor or other computer means 14 permits the microprocessor to determine when the system is or is not to be considered operative. In similar fashion, glycol is drawn from bulk storage via a motor-driven pump 15 to assure an adequate level of buffer storage at a tank 16; to this end, means 17 for on-off control of the motor for pump 15 has separate means of sensing upper and lower levels of glycol in tank 16, and a connection Y—Y to the microprocessor 14 permits the microprocessor to determine when the system is or is not to be considered operative.

Separate supply lines 18-19 from the respective buffer tanks 12, 16 provide controlled flows of water and glycol to a mixing wye-connection point 20. In line 18, flow-control means in the form of a pump 21 and throttling valve 22, under control by microprocessor 14, supply controlled flow of water via the "a" input of a three-ported two-position valve $V_1$, providing normal direct-flow access to the mixing wye 20; valve $V_1$ has a second or "b" input, for access to wye 20, in the event that microprocessor 14 has determined a switched connection of flow to wye 20. In like fashion, line 19 includes flowcontrol means in the form of a pump 23 and throttling valve 24, also under control by microprocessor 14, for supplying a controlled flow of glycol via the "a" input of a three-ported two-position valve $V_2$, providing normal direct-flow access to wye 20; valve $V_2$ has a second or "b" input for access to wye 20, in the event that microprocessor 14 has determined a switch condition of flow to wye 20.

The outlet of wye 20 supplies a mixed-fluid line 25 which contains means 26 for effectively homogenizing and heating the mixture to a predetermined level (e.g., to 180° F.); to this end, a temperature-sensing device 27 is shown at the output of heating means 26 and providing an electrical feedback signal for operation of heat-control means 28. The heat-control means 28 may be the control for a heating source at means 26, or it may be any one of several acceptable devices such as recirculation means for a heat-exchange fluid such as steam, wherein heat exchange with the mixed-fluid flow occurs at means 26. Preferably, the means 26 is plate heat exchanger, operating from a steam or a suitable hot-water source, and commercially available from Chester-Jensen Company, of Chester, Pa. or from APV Crepaco, Inc., of Chicago, Ill. The temperature-sensing means 27 is shown with a further connection to microprocessor 14, for continuous computer-monitoring of mixed-flow temperature.

It is a feature of the invention that quality of de-icing mix issuing from the heated portion of line 25 shall be continuously monitored for maintenance of a predetermined index of refraction. By way of illustration, and for mixed ethylene glycol and water at 180° F., the refractive index is about 1.3450 for a glycol concentration of 30% by weight, and about 1.3750 for a glycol concentration of 60% by weight; and the index of refraction changes about 0.0030 for every 18° F. change in temperature. In the form shown, a refractometer 30 is schematically shown to be continuously operative upon a shunted fraction of the flow in line 25, and the schematic showing also indicates an electric-signal output connection to microprocessor 14. A suitable refractometer for the indicated purpose at 30 is the Maselli Model VR6, FM Series, being a product of the Italian company, Maselli Misure S.p.a., Parma, Italy. This particular model enables mixture-proportion control well within 1 percent of a given set-point value. This is a far greater precision of control than obtainable with any other system known to me. For example, the known shortcomings of present-day de-icing equipment are such that mixtures of water and "glycol" which are excessively "glycol"-rich in the range from 5 percent to 10 percent or more are common practice.

In the system shown, a flowmeter 31 in the mixed-fluid line 25 provides an output signal to the microprocessor 14 so that an appropriate control signal can be dispatched to a flow-control valve 32. Generally speaking, the controlled flow rate will be such, in relation to the instantaneous sum of the throttled flows at 22/24, that an adequate back pressure (e.g., 60 to 75 psig) exists for assurance of a minimum delivery rate of 200 gallons per minute.

Delivery of mixed de-icing fluid is via a selector valve $V_3$ and an on/off delivery valve $V_4$. Selector valve $V_3$ is under microprocessor control and determines whether the mixed fluid is recirculated via line 33 or is directed for delivery to the tank of truck 10 via valve $V_4$. The purpose of recirculation via line 33 is to assure that mixed fluid will not be delivered via valves $V_3/V_4$ unless and until the microprocessor certifies that currently required temperature has been noted by means 27, and until currently correct set-point refractive index has been noted by refractometer 30.

In the drawing, separate arrows are identified "ambient temperature" and "wind velocity" as a schematic indication that ambient weather conditions may be continuously monitored by known devices each of which produces an electrical-signal output to the computer means (microprocessor 14), each such signal being operative in conjunction with the programming of the computer means to determine a changed set point of mixing-proportion control, upon detection of a predetermined change in said ambient weather conditions.

Recirculation is shown to be pumped at 36 under microprocessor control (connection Z—Z) and to flow through a selector valve $V_5$ and a further return line 34 to the "b" ports of mixing valves $V_1/V_2$. If the recirculation is occurring because mixed fluid has not achieved correct temperature, then the microprocessor 14 will shut down the flows in supply lines 18/19 until added heat at 26 produces an indication that correct temperature has been noted at 27; once this correct temperature has been noted, the refractometer output signal will be indicating whether the refractive index is at, below, or above set point. If below set point, the mixture is too lean, and the microprocessor will adjust valve $V_2$ so as to add enriching glycol to the mix; and if above set point, the mixture is too rich, and the microprocessor will adjust valve $V_1$ so as to add thinning water to the mix. Then, once the correct temperature and refractive index are recognized at the microprocessor, $V_3$ is shifted to its delivery position, and as long as valve $V_4$ is open, delivery will be made to the tank of truck 10. It is to be noted that, once delivery commences via $V_3/V_4$, the supply flows in lines 18/19 will resume, through suitably controlled settings determined by the microprocessor, and delivered mix will continue to flow to truck 10 only as long as the temperature and refractive-index requirements continue to be satisfied, and as long as valve $V_4$ remains open.

In the absence of a truck 10 connected to receive mixed de-icing fluid, the valve $V_4$ will remain closed, signifying that no demand exists. A connection from valve $V_4$ to the microprocessor enables the microprocessor to control supply-line and other flows accordingly. But once a truck is connected to receive the delivered flow, an opening of valve $V_4$ is enough to trigger the microprocessor into instant manufacture of the mixture, which may involve some initial recycling as described, before valve $V_3$ is actuated to send correctly heated mixture at correct refractive index to the delivery route $V_3/V_4$. Preferably, an interlock (not shown) between valve $V_4$ and the connection to the tank truck 10 is provided to assure mixed-fluid discharge only in the event of a proper tank-truck connection.

The drawing further shows an ability of the described system to accept mixed fluid from a tank truck 10' which may have delivered only part of its load to an aircraft-spraying location. Thus, the remaining half or other fraction of the tank capacity of truck 10' may contain a mixture which is too glycol-rich (in that it may have been prepared when ambient conditions were more severe than at the time of reclaim and resupply to the described system) or it may be too lean, or it may have cooled to the extent of not meeting the temperature requirement for sprayed mixture. The fraction of mixture in the tank of truck 10' is therefore to be reconditioned for supply to truck 10. As shown, the recirculation pump 36 draws fluid to be reconditioned, from the tank of truck 10' to selector valve $V_5$, once the latter has been shifted to accommodate the reclaimed flow. This reclaimed flow, even if somewhat cooled, will not be nearly as cold as newly supplied water and glycol, in lines 18/19, and therefore a single passage through the heating means 26 will be enough to achieve specified temperature for the refractometer observation. If the refractometer indicates the mixture is too rich, the microprocessor can quickly determine how much "thinning" water needs to be supplied; or if too lean, the microprocessor can similarly determine how much flow of glycol to be additionally mixed, to satisfy the currently operative ambient requirements.

Check valves 37/38, respectively in the return line 33 and in the line of pumping from the tank of truck 10' assure directionally correct fluid re-entry into the described system, whether by recirculation or by reclamation.

It is to be understood that the capacity of the described demand-operated system is not limited to delivery to a single tank truck 10 at any given time. Specifically, a branch delivery line 40 to another on/off delivery valve $V_4'$ and delivery connection 41 will be seen to illustrate that plural tank trucks (such as truck 10) can be concurrently served by the system. As with valve $V_4$, the delivery valve $V_4'$ has its own connection to the microprocessor 14, thereby enabling the microprocessor to recognize added demand by reason of connecting line 41 to another tank truck (not shown) and by opening valve $V_4'$. Having been enabled to recognize the added demand, microprocessor 14 will be understood to operate all flow-rate controls to satisfy the total demanded flow; but the described ability to deliver only mixture which meets current temperature and refractive-index requirements remains as previously described.

Pumps 21, 23 and 36 are preferably variable-speed motor-driven centrifugal pumps to provide adequate flows at required pressures, as needed to achieve specified delivery rate, e.g., 200 gallons/minute, in each delivery connection to a tank truck or other means of de-icing fluid application.

Although it is preferred to employ a flowmeter and an associated flow-control valve, as at 31, 32, it will be understood that desired flows may be instrumentally assured by other means such as a pressure sensor in the output-delivery line, connected to the microprocessor for use in microprocessor control of the supply pumps 21, 23, and/or the recirculation pump 36, depending upon the phase of operation of the system.

At 42, legend indicates that the described system lends itself to automated documentation of each delivery transaction, i.e., each delivery to a tank truck. The documentation is available by retrieval from storage of such data as date and time of the delivery, volume of the delivery and measured refractive index and temperature of the delivered de-icing fluid. The ability to retrieve and print out such data is regarded as important factual data contemporaneous with the delivery, should there later be an inquiry into the question whether the delivery was to correct specifications.

What is claimed is:

1. A demand-operated station having computer means for control of the preparation and delivery of liquid mixture for aircraft de-icing use, comprising liquid-mixing means connected to a mixture-output line; a glycol-supply line including computer-controlled first supply means for delivering a controlled flow of glycol to said mixing means, and a water-supply line including computer-controlled second supply means for delivering a controlled flow of water to said mixing means; said mixing means including a heat exchanger having means for adding heat to a mixed flow of glycol and water, and temperature-sensing means downstream from the heat exchanger for providing feedback control of the heat exchanger for regulating heated mixed-liquid flow to a predetermined elevated temperature; a refractometer connected for continuous response to index of refraction of heated-liquid flow in the mixture-output line, said refractometer producing an electric-signal output to said computer means for computer set-point control of mixing proportions via said first and second supply means; delivery-control means including a flowmeter and a flow-control valve in said mixture-output line, the flowmeter producing an electric-signal output to said flow-control valve via said computer means, computer-controlled valve means operative in one position to deliver flow in said mixture-output line to an output-delivery line and in another position to recirculate flow in said mixture-output line to said mixing means, said temperature-sensing means producing an electric-signal output to said computer means, and said computer means being programmed to normally maintain said valve means in said other position and to operate said valve means to said one position only in the event that both (i) sensed mixed-flow temperature and (ii) refractive index have achieved predetermined values.

2. The station of claim 1, further comprising means sensing an ambient weather condition and producing an electric signal to said computer means in response to currently sensed magnitude of said condition, said computer being programmed to determine a changed set point of mixing-proportion control upon detection of a predetermined change in said ambient-weather condition.

3. The station of claim 1, in which said output-delivery line includes a "ON"/"OFF" control valve with an electric-signal connection to said computer means.

4. The station of claim 3, in which said computer is programmed to foreclose flows in said lines, in the absence of a flow-demanding "ON" condition of said control valve.

5. The station of claim 1, in which said output-delivery line is one of a plurality of output-delivery lines connected in parallel branches to receive delivered flow from said mixture-output line when said computer-controlled valve means is in said one position, each of said output-delivery lines including an "ON"/"OFF" control valve with an electric-signal connection to said computer means, said computer means being programmed to determine flow rates in said supply lines and in said mixture-output line wherein computer-determined flow rates reflect the instantaneous cumulative demand of a plurality of said control valves in "ON" condition.

6. The station of claim 1, in which said glycol-supply line includes a valve having one position in which a flow of unmixed glycol is delivered to said liquid-mixing means and another position in which a recycled flow of glycol/water mixture is delivered to said liquid-mixing means, whereby an excessively rich mixture may be leaned with water, to the currently requisite mixture ratio, in the course of recycling through the station.

7. The station of claim 1, in which said water-supply line includes a valve having one position in which a flow of unmixed water is delivered to said liquid-mixing means and another position in which a recycled flow of glycol/water mixture is delivered to said liquid-mixing means, whereby an excessively lean mixture may be enriched with glycol, to the currently requisite mixture ratio, in the course of recycling through the station.

8. The station of claim 1, in which said glycol-supply line includes a buffer-storage container having liquid-level responsive means producing an electric-signal change in response to detected glycol of less than a predetermined minimum level in said container, said computer means having a connection to said liquid-level responsive means and being programmed to shut down all flows upon an occurrence of said electric-signal change.

9. The station of claim 1, in which said water-supply line includes a buffer-storage container having liquid-level responsive means producing an electric-signal change in response to detected water of less than a predetermined minimum level in said container, said computer means having a connection to said liquid-level responsive means and being programmed to shut down all flows upon an occurrence of said electric-signal change.

10. The station of claim 1, in which data-storage means is associated with said computer means, with selective interrogation and read-out capability.

11. The method of continuously controlling the mixing proportions of separate flows of water and glycol in the supply of aircraft-de-icing fluid, which comprises continuously monitoring the index of refraction of at least a fraction of the mixed-fluid flow which results from combining said separate flows, controlling the flow of one with respect to the other of said separate flows in the direction to achieve a monitored refractive index of predetermined value, recycling the mixed-fluid flow by admixture with at least one of said separate flows until such time as the predetermined refractive index is recognized via the monitoring step, and discharging the mixture for use only upon attaining such recognition.

12. The method of continuously controlling the mixing proportions of separate flows of water and glycol in the supply of aircraft-de-icing fluid, which comprises continuously monitoring the index of refraction of at least a fraction of the mixed-fluid flow which results from combining said separate flows, controlling the flow of one with respect to the other of said separate flows in the direction to achieve a monitored refractive index of predetermined value, and supplying controlled heat to at least one of said flows pursuant to sensed temperature of the mixed-fluid flow.

13. The method of claim 12, and the further step of discharging the mixture for use only (1) upon sensing a predetermined temperature of the mixed-fluid flow and (2) upon attaining a recognition of the predetermined refractive index.

14. A demand-operated station having computer means for control of the preparation and delivery of liquid mixture for aircraft de-icing use, comprising liquid-mixing means connected to a mixture-output line; a glycol-supply line including computer-controlled first supply means for delivering a controlled flow of glycol to said mixing means, and a water-supply line including computer-controlled second supply means for delivering a controlled flow of water to said mixing means; said mixing means including a heat exchanger having means for adding heat to a mixed flow of glycol and water, and temperature-sensing means downstream from the heat exchanger for providing feedback control of the heat exchanger for regulating heated mixed-liquid flow to a predetermined elevated temperature; a refractometer connected for continuous response to index of refraction of heated-liquid flow in the mixture-output line, said refractometer producing an electric-signal output to said computer means for computer set-point control of mixing proportions via said first and second supply means; computer-controlled valve means operative in one position to deliver flow in said mixture-output line to an output-delivery line and in another position to recirculate flow in said mixture-output line to said mixing means, said temperature-sensing means producing an electric-signal output to said computer means, and said computer means being programmed to normally maintain said valve means in said other position and to operate said valve means to said one position only in the event that both (i) sensed mixed-flow temperature and (ii) refractive index have achieved predetermined values.

15. A demand-operated station having computer means for control of the preparation and delivery of liquid mixture for aircraft de-icing use, comprising liquid-mixing means connected to a mixture-output line; a glycol-supply line including computer-controlled first supply means for delivering a controlled flow of glycol to said mixing means, and a water-supply line including computer-controlled second supply means for delivering a controlled flow of water to said mixing means; said mixing means including a heat exchanger having means for adding heat to a mixed flow of glycol and water, and temperature-sensing means downstream from the heat exchanger for providing feedback control of the heat exchanger for regulating heated mixed-liquid flow to a predetermined elevated temperature; a refractometer connected for continuous response to index of refraction of heated-liquid flow in the mixture-output line, said refractometer producing an electric-signal output to said computer means for computer set-point control of mixing proportions via said first and second supply means; delivery-control means including flow-sensing means in the mixture-output line and producing an electric-signal to said computer means for control of the respective flow rates in said supply lines, computer-controlled valve means operative in one position to deliver flow in said mixture-output line to an output-delivery line and in another position to recirculate flow in said mixture-output line to said mixing means, said temperature-sensing means producing an electric-signal output to said computer means, and said computer means being programmed to normally maintain said valve means in said other position and to operate said valve means to said one position only in the event that both (i) sensed mixed-flow temperature and (ii) refractive index have achieved predetermined values.

16. The method of continuously controlling the mixing proportions of separate flows of water and glycol in the supply of aircraft-de-icing fluid, which comprises continuously monitoring the index of refraction of at least a fraction of the mixed-fluid flow which results from combining said separate flows, recycling mixed-fluid flow by admixture with at least one of said separate flows, and controlling the flow of one with respect to the other of said separate flows in the direction to achieve a monitored refractive index of predetermined value.

17. The method of continuously controlling the mixing proportions of separate flows of water and glycol in the supply of aircraft-de-icing fluid, which comprises continuously monitoring the index of refraction of at least a fraction of the mixed-fluid flow which results from combining said separate flows, supplying controlled heat to the mixed-fluid flow pursuant to sensed temperature of the mixed-fluid flow, and controlling the flow of one with respect to the other of said separate flows in the direction to achieve a monitored refractive index of predetermined value.

18. The method of continuously controlling the mixing proportions of separate flows of water and glycol in the supply of aircraft-de-icing fluid, which comprises continuously monitoring the index of refraction of at least a fraction of the mixed-fluid flow which results from combining said separate flows, recycling mixed-fluid flow by admixture with at least one of said separate flows, whereby re-mixed fluid flow includes recycled fluid, supplying heat to the remixed fluid flow pursuant to sensed temperature of the mixed-fluid flow, and controlling the flow of one with respect to the other of said separate flows in the direction to achieve a monitored refractive index of predetermined value.

19. The method of continuously controlling the mixing proportions of water and glycol in a mixed-fluid supply of aircraft-de-icing fluid, which comprises supplying heat to the mixed-fluid flow pursuant to sensed temperature of the mixed-fluid flow, continuously monitoring the index of refraction of at least a fraction of the heated mixed-flow, recycling the heated mixed-fluid flow through the steps of heating and refractive-index monitoring, and controlling the flow of at least one of said separate flows in the direction to continuously achieve a monitored refractive index of predetermined value.

* * * * *